(12) United States Patent
Ishimoto

(10) Patent No.: US 8,858,009 B2
(45) Date of Patent: Oct. 14, 2014

(54) LIGHTING DEVICE, DISPLAY DEVICE AND TELEVISION DEVICE

(75) Inventor: Yoshitake Ishimoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 178 days.

(21) Appl. No.: 13/700,140

(22) PCT Filed: Apr. 21, 2011

(86) PCT No.: PCT/JP2011/059792
§ 371 (c)(1),
(2), (4) Date: Nov. 27, 2012

(87) PCT Pub. No.: WO2011/158553
PCT Pub. Date: Dec. 22, 2011

(65) Prior Publication Data
US 2013/0093965 A1 Apr. 18, 2013

(30) Foreign Application Priority Data

Jun. 16, 2010 (JP) ................................ 2010-137234

(51) Int. Cl.
| | |
|---|---|
| *G09F 13/04* | (2006.01) |
| *F21V 8/00* | (2006.01) |
| *F21V 7/00* | (2006.01) |
| *G02F 1/1335* | (2006.01) |

(52) U.S. Cl.
CPC ............ *F21V 7/0066* (2013.01); *G02B 6/0088* (2013.01); *G02B 6/0055* (2013.01); *G02F 2201/54* (2013.01); *G02F 1/133615* (2013.01)
USPC ........................................ 362/97.2; 362/97.3

(58) Field of Classification Search
USPC ........ 362/612, 615, 97.2, 97.3, 217.1, 296.01
See application file for complete search history.

(56) References Cited

U.S. PATENT DOCUMENTS

| | | |
|---|---|---|
| 2003/0053008 A1 | 3/2003 | Nakano |
| 2006/0268194 A1 | 11/2006 | Morimoto et al. |
| 2011/0211366 A1* | 9/2011 | Huang et al. .................. 362/612 |

FOREIGN PATENT DOCUMENTS

| | | |
|---|---|---|
| JP | 2004-085633 A | 3/2004 |
| JP | 2006-330536 A | 12/2006 |

(Continued)

OTHER PUBLICATIONS

Official Communication issued in International Patent Application No. PCT/JP2011/059792, mailed on Aug. 9, 2011.

*Primary Examiner* — Vip Patel
(74) *Attorney, Agent, or Firm* — Keating & Bennett, LLP

(57) ABSTRACT

An object is to provided a lighting device in which damage due to friction between a reflection sheet and a light guide plate is reduced or suppressed even if a stress is applied toward the reflection sheet by a housing due to asperities of a bottom plate of the housing. A backlight unit 24 according to the present invention includes a light guide plate 20, an LED unit 32, a reflection sheet 26, a backlight chassis 22, and a cushion sheet 27. The light guide plate 20 has a light entrance surface 20*a* that is a side surface, a light exit surface 20*b* that is a plate surface, and an opposite surface 20*c* that is an opposite surface from the light exit surface 20*b*. The LED unit 32 is arranged opposite the light entrance surface 20*a* of the light guide plate 20. The reflection sheet 26 is arranged so as to be in contact with the opposite surface 20*c* of the light guide plate 20. The backlight chassis 22 holds at least the reflection sheet 26 and the light guide plate 20 therein. The reflection sheet 26 and the light guide plate 20 are arranged on a surface of the bottom plate 22*a* in this sequence from the bottom plate 22*a* side. The cushion sheet 27 is configured to absorb a stress applied by the bottom plate 22*a* toward the reflection sheet 26 and arranged between the backlight chassis 22 and the reflection sheet 26.

11 Claims, 4 Drawing Sheets

(56) References Cited

FOREIGN PATENT DOCUMENTS

| JP | 2007-299573 A | 11/2007 |
| JP | 2007-317360 A | 12/2007 |
| JP | 2009-245885 A | 10/2009 |
| JP | 2010-114062 A | 5/2010 |

* cited by examiner

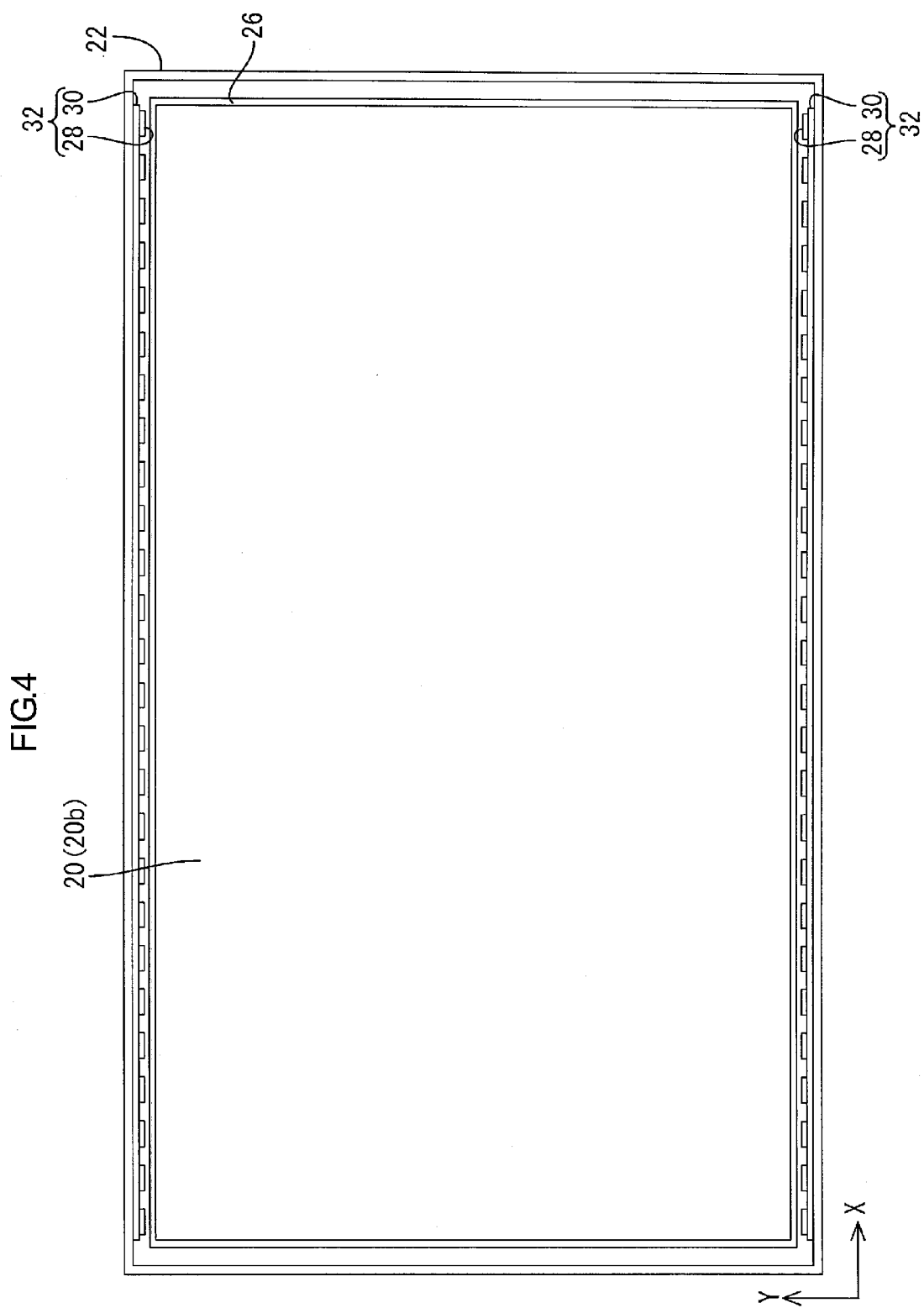

LIGHTING DEVICE, DISPLAY DEVICE AND TELEVISION DEVICE

TECHNICAL FIELD

The present invention relates to a lighting device, a display device, and a television device.

BACKGROUND ART

Displays in image display devices, such as television devices, are now being shifted from conventional cathode-ray tube displays to thin displays, such as liquid crystal displays and plasma displays. With the thin displays, the thicknesses of the image display devices can be decreased. Liquid crystal panels included in the liquid crystal display devices do not emit light, and thus backlight devices are required as separate lighting devices.

An edge light-type backlight device including a light guide plate with a light entrance surface on the side and light sources such as LEDs arranged closer to the side of the light guide plate is known as an example of a backlight device. In such a backlight device, a reflection sheet may be placed on surface of a bottom plate of a chassis and the light guide plate may be placed on the surface of a reflections sheet (as in a backlight device disclosed in Patent Document 1). Because the light guide plate is placed on the surface of the reflection sheet, no gap is provided between the reflection sheet and the light guide plate. Therefore, a loss in reflection light between the reflection sheet and the light guide plate is reduced or suppressed.

RELATED ART DOCUMENT

Patent Document
  Patent Document 1: Japanese Unexamined Patent Application Publication No. 2006-330536

Problem to be Solved by the Invention

If the light guide plate is place on the surface of the reflection sheet and the bottom plate of the chassis has asperities, a stress may be applied to the reflection sheet by the chassis due to the asperities. As a result, damage may be caused by friction between the reflection sheet and the light guide plate.

DISCLOSURE OF THE PRESENT INVENTION

The present invention was made in view of the foregoing circumstances. An object of the present invention is to provide a lighting device in which damage due to friction between a reflection sheet and a light guide plate is reduced or suppressed even if a stress is applied toward the reflection sheet by a housing due to asperities of a bottom plate of the housing.

Means for Solving the Problem

Technologies described herein are related to a lighting device having the following configurations. The lighting device includes a light guide plate, a light source, a reflection sheet, a housing, and a cushion member. The light guide plate has a light entrance surface, a light exit surface, and an opposite surface. The light entrance surface is a side surface of the light guide plate. The light exit surface is one of plate surfaces of the light guide plate. The opposite surface is an opposite surface from the light exit surface. The light source is arranged opposite the light entrance surface of the light guide plate. The reflection sheet is arranged so as to be in contact with the opposite surface of the light guide plate. The housing has a bottom plate and holds the reflection sheet and light guide plate arranged on one of surfaces of the bottom plate in this sequence from a bottom plate side. The cushion member is configured to absorb a stress applied by the bottom plate toward the reflection sheet and arranged between the housing and the reflection sheet.

In the above-described lighting device, the stress is reduced by the cushion member even if the stress is applied toward the reflection sheet by the hosing due to asperities of the bottom plate of the housing. With this configuration, stresses hardly or are less likely to concentrate between the reflection sheet and the light guide plate due to the aspirations of the bottom plate of the housing. Therefore, damage due to friction between the reflection sheet and the light guide plate can be reduced or suppressed.

The cushion member may have a sheet-like shape.

With this configuration, the stress applied by the aspirations of the bottom plate of the housing can be effectively reduced.

The cushion member may have a constant thickness.

With this configuration, the light guide plate that is in contact with the reflection sheet can be leveled and brightness setting of the lighting device can be effectively performed.

The cushion member may include polyethylene terephthalate as a main material.

With this configuration, the stress applied by the aspirations of the bottom plate of the housing can be effectively reduced.

The reflection sheet may have a beads coated surface that is in contact with the light guide plate.

With this configuration, the reflection sheet is less likely to be or is hardly in contact with the light guide plate. Therefore, uneven brightness hardly occurs or is less likely to occur on the display surface due to the close contact between the reflection sheet and the light guide plate.

The reflection sheet is in contact with an entire area of the opposite surface of the light guide plate.

With this configuration, light that leaks from the light guide plate toward the reflection sheet can be effectively reflected by the reflection sheet.

The cushion member is in contact with an entire area of the reflection sheet that is opposite the cushion member.

Because the cushion member is arranged between the reflection sheet and the bottom plate of the housing for entire areas, an effect of the asperities of the bottom plate of the housing on the reflection sheet is effectively reduced or suppressed.

The cushion member may have heat dissipation properties.

If a temperature of the reflection sheet increases due to heat generated around the light source, the heat in the reflection sheet can be dissipated by the cushion member. With this configuration, the reflection sheet hardly thermally expands or is less likely to thermally expand.

The technologies described in this specification may be applied to a display device including a display panel configured to provide display using light from the above-described lighting device. A display device that includes a liquid crystal panel as such a display panel may be considered as new and advantageous. Furthermore, a television device including the above-described display device may be considered as new and advantageous. In the above-described display device or the above-described television device, a display area can be increased.

Advantageous Effect of the Invention

According to the technologies described in this specification, a lighting device in which damage due to friction between a reflection sheet and a light guide plate can be reduced or suppressed even if a stress is applied toward the reflection sheet by a housing due to asperities of a bottom plate of the housing.

BRIEF DESCRIPTION OF THE DRAWINGS

FIG. 4 is a plan view of the front of a backlight unit 24.

MODE FOR CARRYING OUT THE INVENTION

An embodiment will be explained with reference to drawings. X-axes, Y-axes and Z-axes are indicated in some drawings. The axes in each drawing correspond to the respective axes in other drawings. The X-axes and Y-axes are aligned with the horizontal direction and the vertical direction, respectively. In the following description, the top-bottom direction corresponds to the vertical direction unless otherwise specified.

Figure 1:
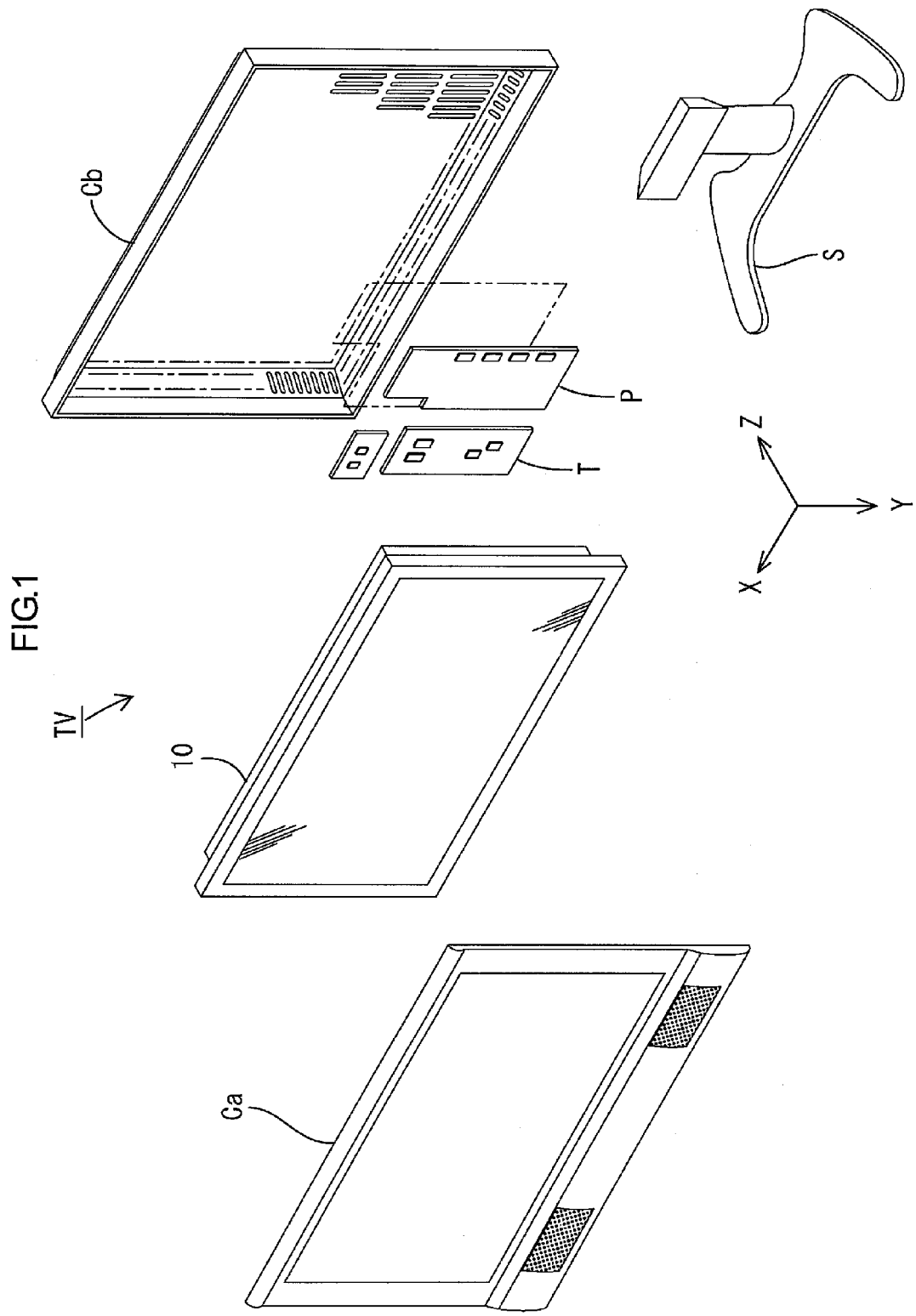
FIG. 1 is an exploded perspective view of a television device TV according to a first embodiment.

FIG. 1 is an exploded perspective view of a television device TV according to the first embodiment. The television device TV includes the liquid crystal display device 10, front and rear cabinets Ca, Cb that hold the liquid crystal display device 10 therebetween, a power source P, a tuner T, and a stand S.

Figure 2:
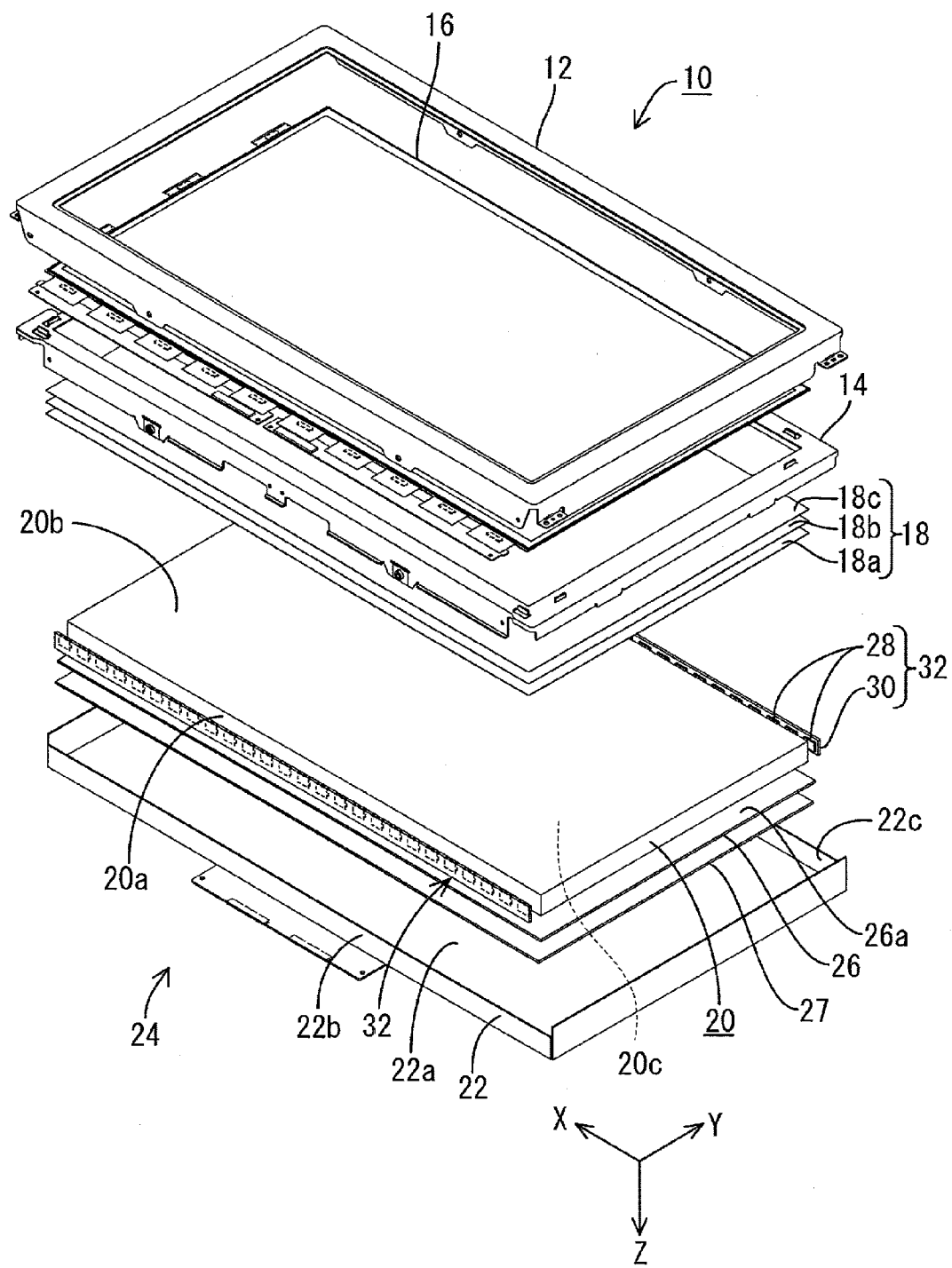
FIG. 2 is an exploded perspective view of a liquid crystal display device 10.

FIG. 2 is an exploded perspective view of the liquid crystal display device 10. In FIG. 2, the upper side and the lower side correspond to the front side and the rear side of the liquid crystal display device 10, respectively. As illustrated in FIG. 2, an overall shape of the liquid crystal display device 10 is a landscape rectangular. The liquid crystal display device 10 includes a liquid crystal panel 16 and a backlight unit 24. The liquid crystal panel 16 is a display panel and the backlight unit 24 is an external light source. The liquid crystal panel 16 and the backlight unit 24 are integrally held with a bezel 12 having a frame-like shape.

Next, the liquid crystal panel 16 will be explained. The liquid crystal panel 16 includes a pair of transparent glass substrates (having a high light transmission capability) and a liquid crystal layer (not illustrated). The glass substrates are bonded together with a predetermined gap therebetween. The liquid crystal layer is sealed between the glass substrates. On one of the glass substrates, switching components (e.g., TFTs) connected to source lines and gate lines that are perpendicular to each other, pixel electrodes connected to the switching components, and an alignment film are provided. On the other substrate, a color filter having color sections such as R (red), G (green) and B (blue) color sections arranged in a predetermined pattern, counter electrodes and an alignment film are provided. Image data and various control signals are transmitted from a driver circuit board (not illustrated) to the source lines, the gate lines, and the counter electrodes for displaying images. Polarizing plates (not illustrated) are attached to outer surfaces of the glass substrates.

Next, the backlight unit 24 will be explained. As illustrated in FIG. 2, the backlight unit 24 includes a frame 14, an optical member 18, and a backlight chassis 22. The frame 14 supports the liquid crystal panel 16 at the inner edges thereof. The optical member 18 is placed on the front surface of a light guide plate 20 (on a light exit surface 20b). The backlight chassis 22 has a substantially box-like shape with an opening on the front side (the light exit side closer to the liquid crystal panel 16).

A pair of LED (light emitting diodes) units 32, a cushion sheet 27, a reflection sheet 26, and the light guide plate 20 are held in the backlight chassis 22. The LED units 32 are arranged along the long edges, or on side plates 22b and 22c, of the backlight chassis 22, respectively. The LED units 32 emit light. The light guide plate 20 is arranged such that long side surfaces (light entrance surfaces) 20a are opposite the respective LED units 32. The light emitted by each LED unit 32 is guided to the liquid crystal panel 16. The optical member 18 is placed on the front surface of the light guide plate 20. In the backlight unit 24 of this embodiment, the light guide plate 20 and the optical member 18 are arranged immediately below the liquid crystal panel 16. Furthermore, the LED units 32, which are light sources, are arranged at the side edges of the light guide plate 20. Namely, the backlight unit 24 uses an edge lighting method (a side lighting method).

The backlight chassis 22 is made of metal, for instance, aluminum-based material. The backlight chassis 22 includes a bottom plate 22a, long edge portions 22b, 22c and short edge portions. The long edge portions 22b and 22c rise from the respective long edges of the bottom plate 22a. The short edge portions rise from the respective short edges of the bottom plate 22a. In the backlight chassis 22, space between the LED units 32 that are opposite to each other is holding space for the light guide plate 20. A power supply circuit board for supplying power to the LED units 32 is mounted to the rear surface of the bottom plate 22a (not illustrated).

The optical member 18 includes a diffuser sheet 18a, a lens sheet 18b, and a reflection-type polarizing plate 18c layered in this sequence from the light guide plate 20 side. The diffuser sheet 18a, the lens sheet 18b, and the reflection-type polarizing plate 18c have a function to convert the light emitted by the LED units 32 and passed through the light guide plate 20 into planar light. The liquid crystal panel 16 is arranged on the upper surface of the reflection-type polarizing plate 18d. The optical member 18 is arranged between the light guide plate 20 and the liquid crystal panel 16.

Each LED unit 32 includes an LED board 30 and LEDs 28. The LED board 20 is rectangular and made of resin. The LEDs 28 configured to emit white light are arranged in line on the LED board 30. The LED boards 30 are fixed to the side plate 22b and 22c of the backlight chassis 22 with screws, respectively. Each LED 28 can be configured as one of the followings. The LED 28 may include a blue light emitting element with a phosphor having a light emission peak in a yellow region applied on the blue light emitting element to emit white light. The LED 28 may include a blue light emitting element with a phosphor having a light emission peak in a green region and a phosphor having a light emission peak in a red region applied on the blue light emitting element to emit white light. The LED 28 may include a blue light emitting element with a phosphor having a light emission peak in a green region applied on the blue light emitting element, and a red light emitting element to emit white light. The LED 28 may include an ultraviolet light emitting element and a phosphor. The LED 28 may include an ultraviolet light emitting element with phosphors having light emissions peaks in the blue region, the green region, and the red region, respectively, applied on the ultraviolet light emitting element.

Next, the cushion sheet 27, the reflection sheet 28, and the light guide plate 20 held in the backlight chassis 22 will be explained. The cushion sheet 27 includes a polyethylene terephthalate-based resin sheet having heat dissipation properties. The cushion sheet 27 has a constant thickness for a substantially entire area thereof. The cushion sheet 27 is plated on the bottom plate 22a of the backlight chassis 22 so as to cover and about entire surface of the bottom plate 22a. If the bottom plate 22a of the backlight chassis 22 has asperities, stresses are applied to the cushion sheet 27 by protrusions on the bottom plate 22a of the backlight chassis 22 toward the reflection sheet 26. The cushion sheet 27 absorbs such stresses applied to the cushion sheet 27 by the protrusions on the bottom plate 22a of the backlight chassis 22. The thickness of the cushion sheet 27 is not specified. If the thickness of the cushion sheet 27 is increased, the stresses can be easily absorbed. However, that may provides a negative effect on reduction in thickness of the backlight unit 24. Therefore, the thickness of the cushion sheet 27 may be properly adjusted according to specifications of the backlight unit 24.

The reflection sheet 26 is made of synthetic resin with a white surface having a high light reflectivity. The reflection sheet 26 is placed on the front surface of the cushion sheet 27. The front surface of the reflection sheet 26 is a light reflection surface that is in contact with an opposite surface 20c of the light guide plate 20. If light leaks from the LED units 32 or the light guide plate 20 and travel toward the opposite surface 20c side, the light is reflected by the reflection sheet 26. The surface of the reflection sheet 26 in contact with the opposite surface 20c of the light guide plate 20 is beads coated and thus less likely to stick to the opposite surface 20c of the light guide plate 20.

The light guide plate 20 is a rectangular plate made of resin having a high light transmission capability (high transparency), such as acrylic. The light guide plate 20 is in contact with the reflection sheet 26 and supported by the backlight chassis 22. As illustrated in FIG. 2, the light guide plate 20 is arranged between the LED unit 26 and the side plate 22c of the backlight chassis 22 such that the light exit surface 20, which is a main surface, faces the diffuser sheet 18a and the opposite surface 20c, which is opposite from the light exit surface 20b, faces the light reflection sheet 26. Because the light guide plate 20 is arranged as described above, the light emitted by the LED unit 32 enters the light guide plate 20 through the light entrance surface 20a and exits therefrom through the light exit surface 20b that faces the diffuser sheet 18a. As a result, the liquid crystal panel 16 is illuminated from the back.

Figure 3:
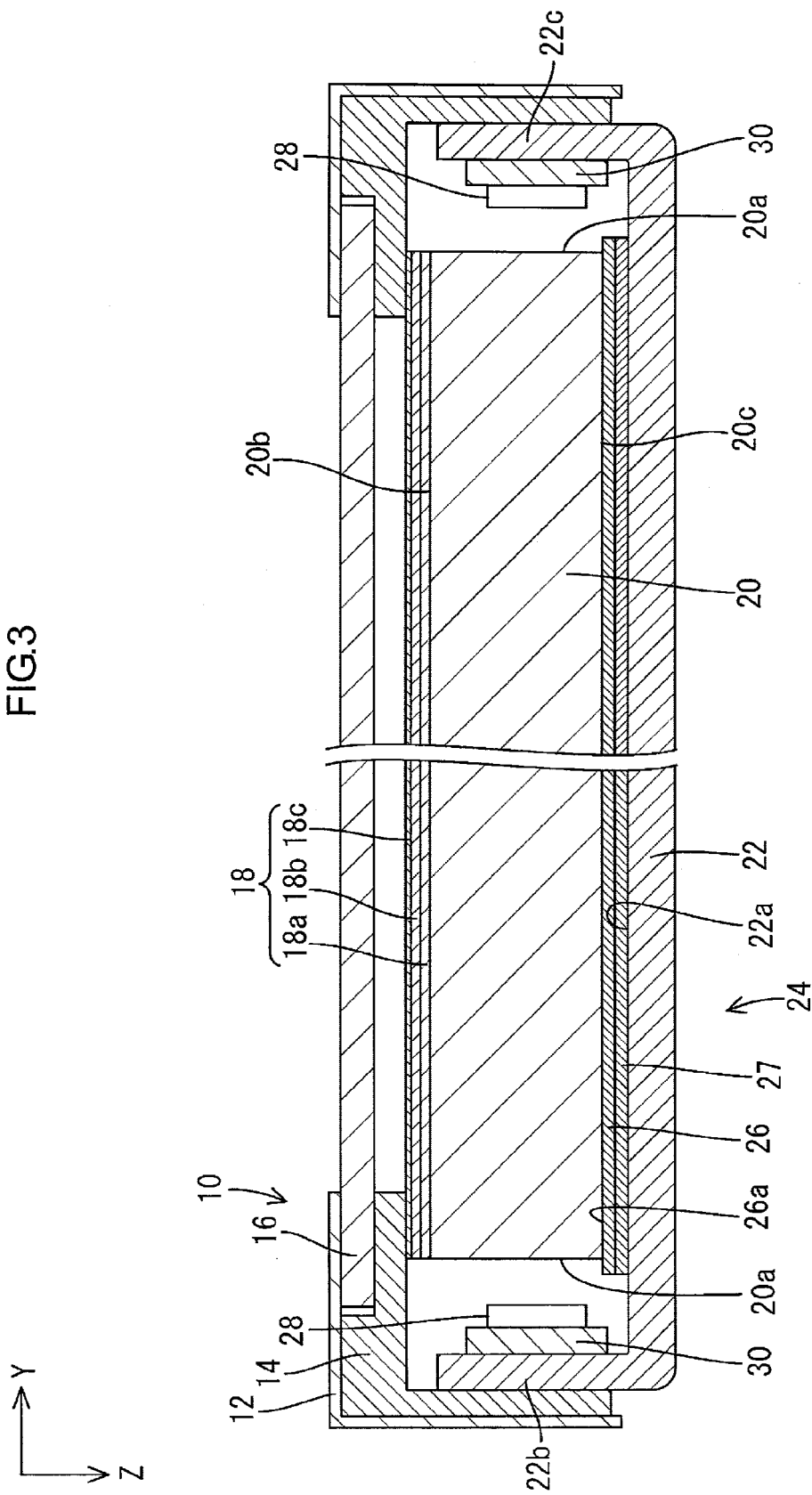
FIG. 3 is a cross-sectional view of the liquid crystal display device 10 along the vertical direction.

Next, how the cushion sheet 27, the reflection sheet 26, and the light guide plate 20 are layered will be explained. FIG. 4 is a plan view of the front of the backlight unit 24. As illustrated in FIGS. 3 and 4, the reflection sheet 26 is slightly larger than the opposite surface 20c of the light guide plate 20. As illustrated in FIG. 3, the cushion sheet 27 is substantially equal in size to the reflection sheet 26. Namely, the entire surface of the cushion sheet 27 is in contact with the entire surface of the reflection sheet 26.

In the backlight unit 24, the cushion sheet 27 and the reflection sheet 26 are placed in sequence on the surface of the bottom plate 22a of the backlight chassis 22. Therefore, the stresses applied by the bottom plate 22a due to the aspirations toward the reflection sheet 26 are absorbed and thus the stresses are reduced or suppressed. Furthermore, the light guide plate 20 is placed on the surface of the reflection sheet 26. A gap is present between the reflection sheet 26 and the light guide plate 20. Therefore, a loss in reflection light between the reflection sheet 26 and the light guide plate 20 is reduced or suppressed.

As described above, in the backlight unit 24 of this embodiment, the stresses that may be applied by the bottom plate 22a of the backlight chassis 22 toward the reflection sheet 26 due to the aspirations are absorbed by the cushion sheet 27. With this configuration, the stresses hardly or are less likely to concentrate between the reflection sheet 26 and the light guide plate 20 due to the aspirations of the bottom plate 22a of the backlight chassis 22. Therefore, damage due to friction between the reflection sheet 26 and the light guide plate 20 can be reduced or suppressed.

In the backlight unit 24 of this embodiment, the cushion sheet 27 is arranged on the surface of the bottom plate 22a of the backlight chassis 22. With this configuration, the stresses due to the aspirations of the bottom plate 22a of the backlight chassis 22 can be effectively absorbed by the cushion sheet 27.

In the backlight unit 24 of this embodiment, the cushion sheet 27 has the constant thickness. With this configuration, the light guide plate 20 that is in contact with the reflection sheet 26 can be leveled and brightness setting of the backlight unit 24 can be effectively performed.

In the backlight unit 24 of this embodiment, the main material of the cushion sheet 27 is polyethylene terephthalate. With this configuration, the stresses due to the aspirations of the bottom plate 22a of the backlight chassis 22 can be effectively absorbed by the cushion sheet 27.

In the backlight unit 24 of this embodiment, the surface of the reflection sheet 26 that is in contact with the light guide plate 20 is beads coated. With this configuration, the reflection sheet 26 hardly sticks or is less likely to stick to the light guide plate 20. Therefore, the uneven brightness hardly occurs or is less likely to occur on the display surface of the liquid crystal panel 16 due to the close contact between the reflection sheet 26 and the light guide plate 20.

In the backlight unit 24 of this embodiment, the entire surface of the reflection sheet 26 is in contact with the entire surface of the opposite surface 20c of the light guide plate 20. With this configuration, even if light leaks from the light guide plate 20 toward the reflection sheet 26, the light can be effectively reflected by the reflection sheet 26.

In the backlight unit 24 of this embodiment, the entire surface of the cushion sheet 27 is in contact with the entire surface of the reflection sheet 26 opposite the cushion sheet 27. The cushion sheet 27 is arranged between the reflection sheet 26 and the bottom plate 22 of the backlight chassis 22 across the entire surfaces. With this configuration, an effect of the asperities of the bottom plate 22a of the backlight chassis 22 on the reflection sheet 26 is effectively reduced or suppressed.

In the backlight unit 24 of this embodiment, the cushion sheet 27 has heat dissipation properties. If the temperature of the reflection sheet 26 increases due to heat generated around the LEDs 28, the heat in the reflection sheet can be dissipated by the cushion sheet 27. With this configuration, the reflection sheet 26 hardly thermally expands or is less likely to thermally expand.

Relationships between elements in this embodiment and elements of the claimed invention will be described. The LEDs 28 may be an example of a light source. The backlight chassis 22 may be an example of a housing. The cushion sheet 27 may be an example of a cushion member.

Modifications of the above embodiments will be listed below.

(1) In the above embodiment, a single cushion sheet is placed on the surface of the bottom plate of the backlight chassis. However, the shape and the number of cushion sheet(s), or the cushion member, is not limited to those in the embodiment. For example, a plurality of small cushion sheets may be dispersed on the surface of the bottom plate of the backlight chassis. In comparison to a configuration in which a single cushion member is plated on the surface of the bottom plate of the backlight chassis, the amount of the cushion members can be reduced. Therefore, the cost of the cushion members can be reduced.

(2) In the above embodiment, the edge light-type backlight unit including the LEDs as light sources is used. However, an edge light-type backlight unit including linear light sources such as discharge tubes may be used.

(3) The shape, the arrangement, and the material of the cushion sheet may be altered as appropriate from those of the cushion sheet in the above embodiment.

(4) In the above embodiments, the liquid crystal display device including the liquid crystal panel as the display panel is used. However, the aspect of the present invention can be applied to display devices including other types of display panels.

(5) In the above embodiments, the television device including the tuner is used. However, the aspect of the present invention can be applied to display devices without tuners.

The embodiments have been described in detail. However, the above embodiments are only some examples and do not limit the scope of the claimed invention. The technical scope of the claimed invention includes various modifications of the above embodiments.

The technical elements described in this specification and the drawings may be used independently or in combination to achieve the technical benefits. The combinations are not limited to those in original claims. With the technologies described in this specification and the drawings, multiple objects may be accomplished at the same time. However, the technical benefits can be achieved by accomplishing even only one of the objects.

EXPLANATION OF SYMBOLS

TV: Television device, Ca, Cb: Cabinet, T: Tuner, S: Stand, 10: Liquid crystal display device, 12: Bezel, 14: Frame, 16: Liquid crystal panel, 18: Optical member, 18*a*: Diffuser sheet, 18*b*: Lens sheet, 18*c*: Reflection-type polarizing plate, 20: Light guide plate, 20*a*: Light entrance surface, 20*b*: Light exit surface, 20*c*: Opposite surface, 22: Backlight chassis, 22*a*: Bottom plate, 22*b*, 22*c*: (Long) Side plate, 24: Backlight unit, 26: Reflection sheet, 27: Cushion sheet, 28: LED, 30: LED board, 32: LED unit.

The invention claimed is:

1. A lighting device comprising:
   a light guide plate having a light entrance surface, a light exit surface, and an opposite surface, the light entrance surface being a side surface of the light guide plate, the light exit surface being one of plate surfaces of the light guide plate, the opposite surface being an opposite surface from the light exit surface;
   a light source arranged opposite the light entrance surface of the light guide plate;
   a reflection sheet arranged so as to be in contact with the opposite surface of the light guide plate;
   a housing having a bottom plate, the housing holding the reflection sheet and the light guide plate arranged on one of surfaces of the bottom plate in this sequence from a bottom plate side; and
   a cushion member configured to absorb a stress applied by the bottom plate toward the reflection sheet and arranged between the housing and the reflection sheet.

2. The lighting device according to claim 1, wherein the cushion member having a sheet-like shape.

3. The lighting device according to claim 1, wherein the cushion member has a constant thickness.

4. The lighting device according to claim 1, wherein the cushion member includes polyethylene terephthalate as a main material.

5. The lighting device according to claim 1, wherein the reflection sheet has a beads coated surface that is in contact with the light guide plate.

6. The lighting device according to claim 1, wherein the reflection sheet is in contact with an entire area of the opposite surface of the light guide plate.

7. The lighting device according to claim 1, wherein the cushion member is in contact with an entire area of the reflection sheet that is opposite the cushion member.

8. The lighting device according to claim 1, wherein the cushion member has heat dissipation properties.

9. A display device comprising:
   a display panel configured to provide display using light from the lighting device according to claim 1.

10. The display device according to claim 8, wherein the display panel is a liquid crystal display panel including liquid crystals.

11. A television device comprising the display device according to claim 9.

* * * * *